US009021374B2

(12) United States Patent
Sola

(10) Patent No.: US 9,021,374 B2
(45) Date of Patent: Apr. 28, 2015

(54) SYSTEMS AND METHODS FOR GENERATING A DASHBOARD IN A MULTI-TENANT DATABASE SYSTEM ENVIRONMENT

(75) Inventor: Thomas Sola, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 520 days.

(21) Appl. No.: 13/076,161

(22) Filed: Mar. 30, 2011

(65) Prior Publication Data
US 2012/0144332 A1 Jun. 7, 2012

Related U.S. Application Data

(60) Provisional application No. 61/419,792, filed on Dec. 3, 2010.

(51) Int. Cl.
 *G06F 3/048* (2013.01)
 *G06F 9/44* (2006.01)
 *G06F 17/30* (2006.01)

(52) U.S. Cl.
 CPC ............ *G06F 8/34* (2013.01); *G06F 17/30398* (2013.01); *G06F 17/30554* (2013.01)

(58) Field of Classification Search
 CPC ....... G06F 8/34; G06F 8/38; G06F 17/30398; G06F 17/30554
 USPC .......................................................... 715/763
 See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

*Primary Examiner* — Alvin Tan
(74) *Attorney, Agent, or Firm* — Ingrassia Fisher & Lorenz, P.C.

(57) ABSTRACT

A system and method for creating a dashboard in multi-tenant database environment is provided. The method may include, but is not limited to receiving, by a processor, positional data and one of a component type and a data source within a database in the multi-tenant database environment for a dashboard object via a first drag and drop operation, receiving, by the processor, the other of the component type and the data source within the database in the multi-tenant database environment for the dashboard object via a second drag and drop operation, and generating, by the processor, display data for the dashboard based upon the dashboard object in real time based upon the received component type, the received positional data and the received data source.

14 Claims, 10 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,412,658 B2 * | 8/2008 | Gilboa .................... 715/762 |
| 7,546,543 B2 * | 6/2009 | Louch et al. ............ 715/762 |
| 7,620,655 B2 | 11/2009 | Larsson et al. |
| 7,698,160 B2 | 4/2010 | Beaven et al. |
| 7,711,660 B1 * | 5/2010 | Gentile et al. ............ 706/8 |
| 7,987,428 B2 * | 7/2011 | Handy et al. ............ 715/762 |
| 8,082,301 B2 | 12/2011 | Ahlgren et al. |
| 8,095,413 B1 | 1/2012 | Beaven |
| 8,095,417 B2 * | 1/2012 | Handy et al. ............ 705/7.39 |
| 8,095,594 B2 | 1/2012 | Beaven et al. |
| 8,275,836 B2 | 9/2012 | Beaven et al. |
| 8,291,334 B1 * | 10/2012 | Castellanos et al. ..... 715/769 |
| 8,332,435 B2 * | 12/2012 | Ballard et al. ........... 707/795 |
| 8,407,338 B2 * | 3/2013 | Brady ..................... 709/224 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2010/0088636 A1 * | 4/2010 | Yerkes et al. ............ 715/809 |
| 2010/0131547 A1 * | 5/2010 | Magrath et al. .......... 707/769 |
| 2011/0004627 A1 * | 1/2011 | Reca et al. ............... 707/778 |
| 2011/0153684 A1 * | 6/2011 | Yung ....................... 707/805 |
| 2011/0214078 A1 * | 9/2011 | Klask et al. .............. 715/763 |

\* cited by examiner

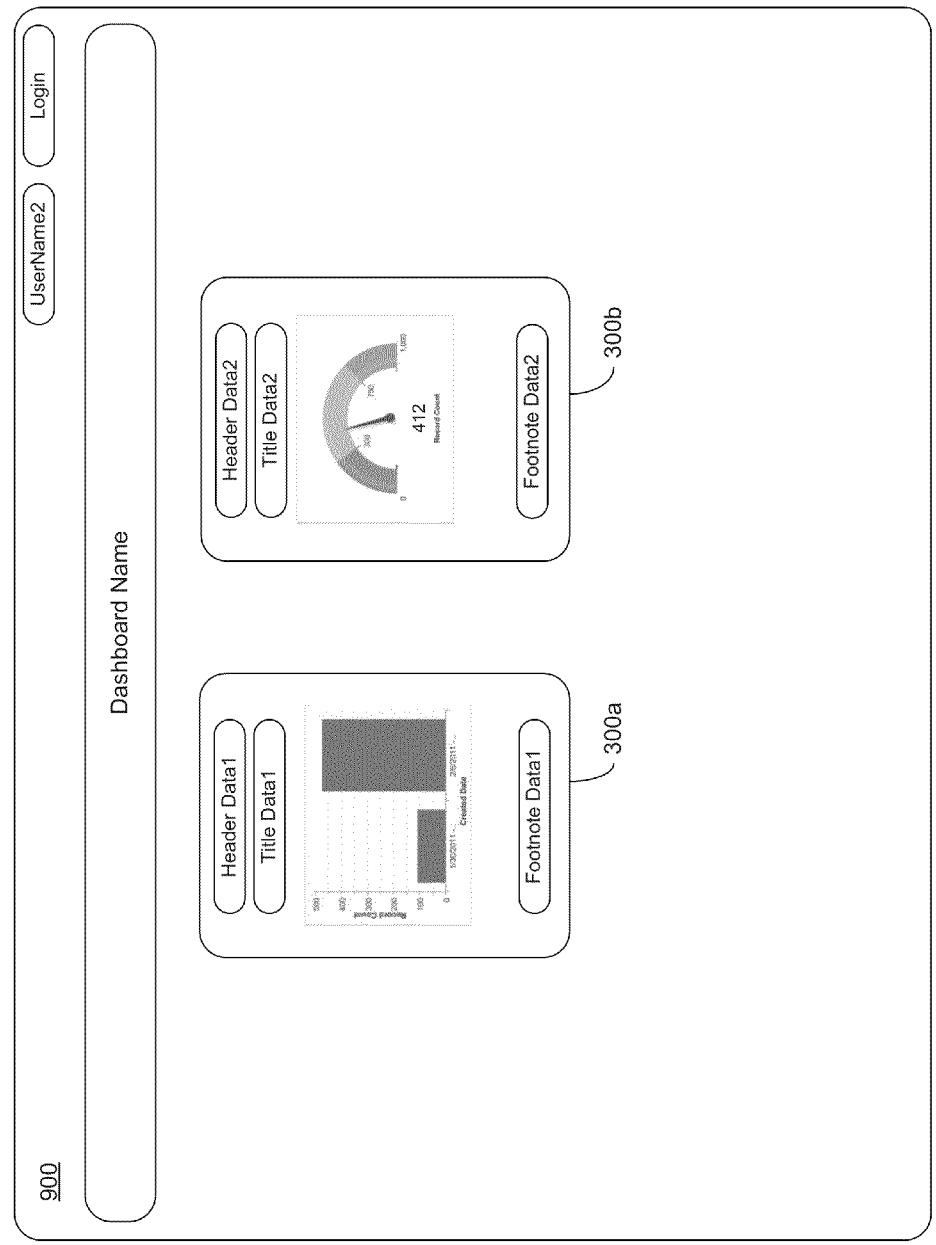

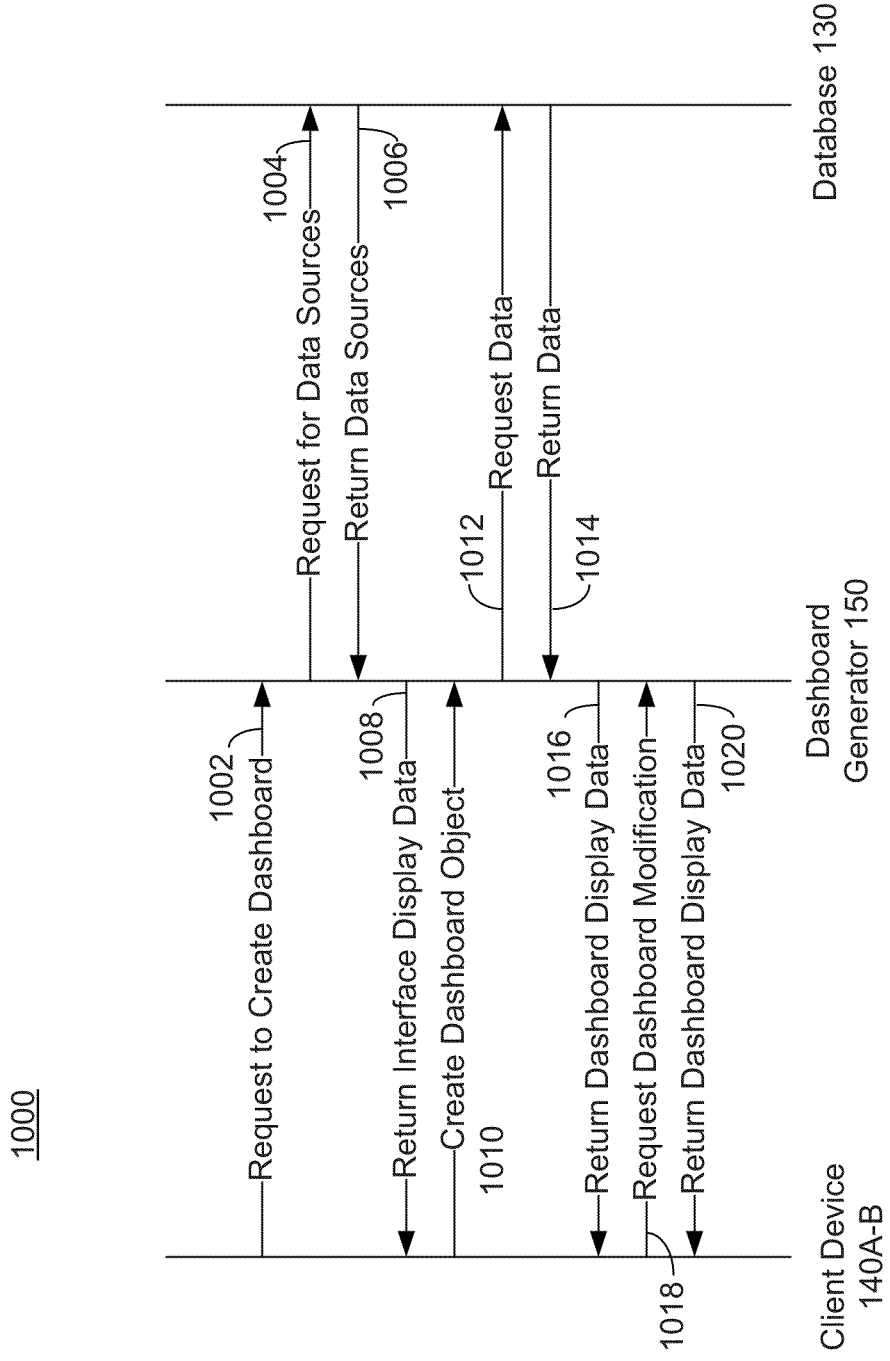

SYSTEMS AND METHODS FOR GENERATING A DASHBOARD IN A MULTI-TENANT DATABASE SYSTEM ENVIRONMENT

CROSS-REFERENCE TO RELATED APPLICATION(S)

This application claims the benefit of U.S. provisional patent application Ser. No. 61/419,792, filed Dec. 3, 2010, the entire content of which is incorporated by reference herein.

TECHNICAL FIELD

The following relates to computer interfaces, and more particularly relates to systems and methods for generating dashboards in a multi-tenant database environment.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Although multi-tenant platforms can provide substantial benefits, they can be relatively difficult to design and develop. The often competing demands of integration and isolation between tenants, for example, can lead to any number of challenges in design and implementation. For example, even though multiple tenants share a common server, each tenant may be able to provide data or services to its customers using the tenant's own separate, unique network domain. Furthermore, applications which are accessible by multiple tenants, such as certain report generators, need to maintain data isolation between the multiple tenants.

DESCRIPTION OF THE DRAWING FIGURES

Exemplary embodiments will hereinafter be described in conjunction with the following drawing figures, wherein like numerals denote like elements, and FIG. 1 is a block diagram of an exemplary multi-tenant data processing system;

FIG. 9 illustrates an exemplary dashboard 900 generated based upon the dashboard illustrated in FIG. 8; and FIG. 10 is a flow diagram illustrating an exemplary method for creating a dashboard using a dashboard generating application and dashboard generation interface, in accordance with an embodiment.

DETAILED DESCRIPTION

According to various exemplary embodiments, systems and methods are provided to allow a user to generate a dashboard in a multi-tenant database environment. A dashboard is a useful tool to demonstrate interrelationships between multiple data sets. An exemplary system for generating a dashboard using a computer interface may include, but is not limited to a database configured to securely store tenant based data and a processor communicatively connected to the database. The processor can be configured to receive positional data and one of a component type and a data source within the database for a dashboard object via data from a first drag and drop operation, receive the other of the component type and the data source within the database for the dashboard object via data from a second drag and drop operation and to generate display data for the dashboard based upon the dashboard object in real time based upon the received component type, the received positional data and the received data source.

Figure 1:
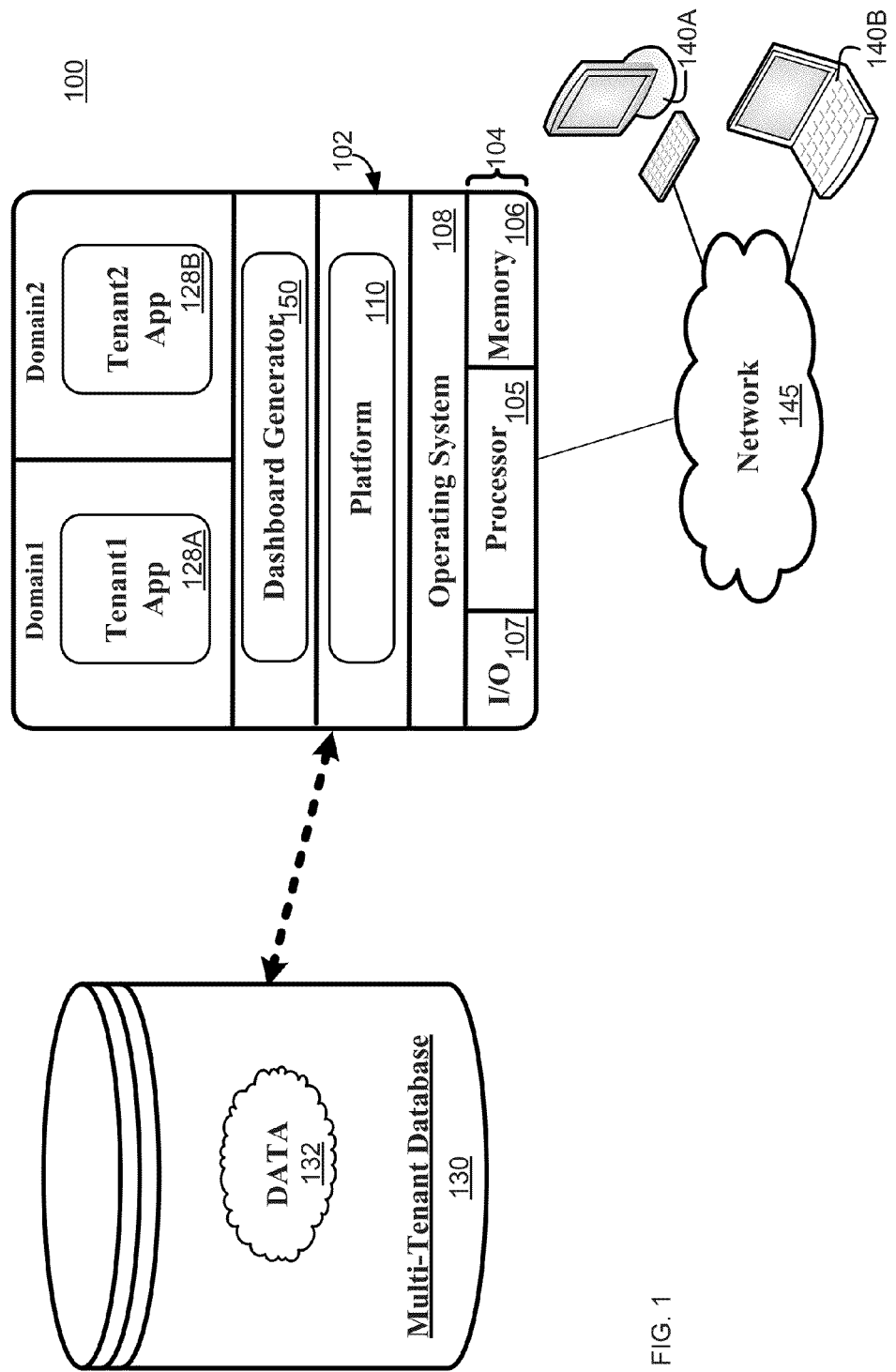

Turning now to FIG. 1, an exemplary multi-tenant application system 100 suitably includes a server 102 that dynamically creates virtual applications 128A-B based upon data 132 from a common database 130 that is shared between multiple tenants. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100. Each virtual application 128A-B may be accessible via a unique domain. For example, the virtual application 128A may be accessible on a first domain (e.g., http://www.companyname1.salesforce.com) and the application 128B may be accessible on a second domain (e.g., http://www.companyname2.com). The virtual applications 128A-B may be used, for example, by the various tenants to create and manage data or reports based upon data 132 in the common database 130. The server 102 also includes a dashboard generating application 150 having a dashboard generation interface which can be used to create dashboards based upon the data or reports stored in the common database 130, as discussed in further detail below.

A "tenant" generally refers to a group of users that shares access to common data within database 130. Tenants may represent customers, customer departments, business or legal organizations, and/or any other entities that maintain data for particular sets of users within system 100. Although multiple tenants may share access to a common server 102 and database 130, the particular data and services provided from server 102 to each tenant can be securely isolated from those provided to other tenants. The multi-tenant architecture allows different sets of users to share functionality without necessarily sharing each other's data 132.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein.

Server 102 is implemented using one or more actual and/or virtual computing systems that collectively provide a dynamic application platform no for generating virtual applications 128A-B. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform no gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

Figure 2:
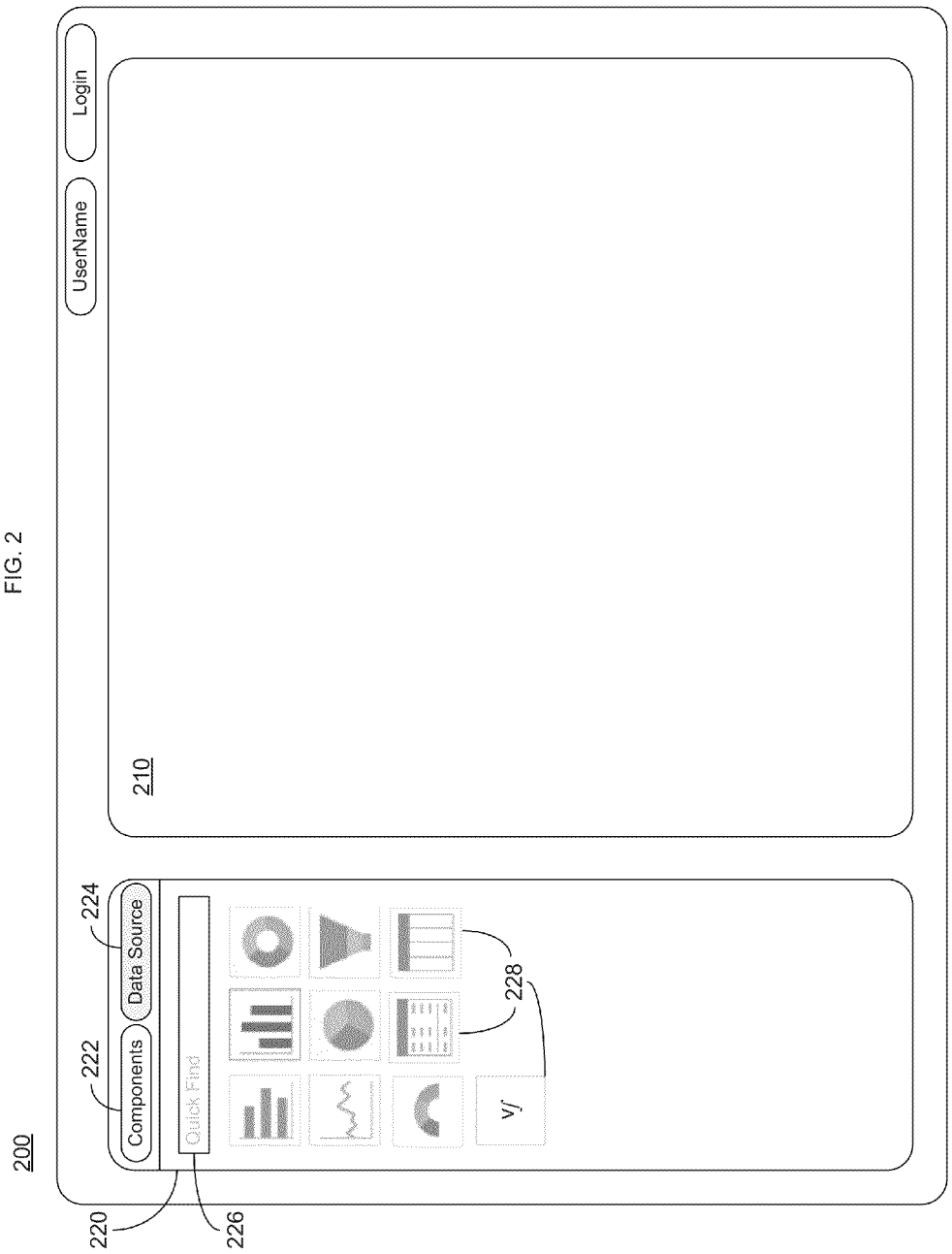
FIG. 2 illustrates an exemplary dashboard generation interface in accordance with an embodiment.

FIG. 2 illustrates an exemplary dashboard generation interface 200 which may be implemented by the dashboard generating application 150 and displayed on a client device 140A-B, in accordance with an embodiment. The interface 200 includes a workspace 210. The workspace 210 is an area when a user can create and modify a dashboard using the dashboard generation interface 200. The dashboard generation interface 200 also includes a dashboard creation utility 220. The utility 220, which may also be called a window or a task pane, provides a drag and drop interface which allows a user to add various components and data sources to the workspace 210. In one embodiment, for example, the utility 220 includes a selectable component source tab 222 and a selectable data source tab 224.

In the embodiment illustrated in FIG. 2, the selectable component source tab 222 has been selected. As seen in FIG. 2, the utility 220 includes one or more icons 228 corresponding to various components. As discussed in further detail below, the components may be used by the user to create various charts, graphs and the like to display on a dashboard. The components may include bar charts, column charts, line charts, pie charts, donut charts, funnel charts, gauges, metrics, graphs, functions, a custom chart or data display, tables, bubbles and/or any other type of data visualization tool. In the embodiment illustrated in FIG. 2, the icons 228 include generic representations of the corresponding respective component. In other embodiments, a simple list of components may be displayed on the utility 220. Further, in other embodiments, the components may be organized and displayed according to component types such as charts, graphs and tables. The utility 220 may also include search tools 226, wherein a user can enter a text search for desired components.

Figure 3:
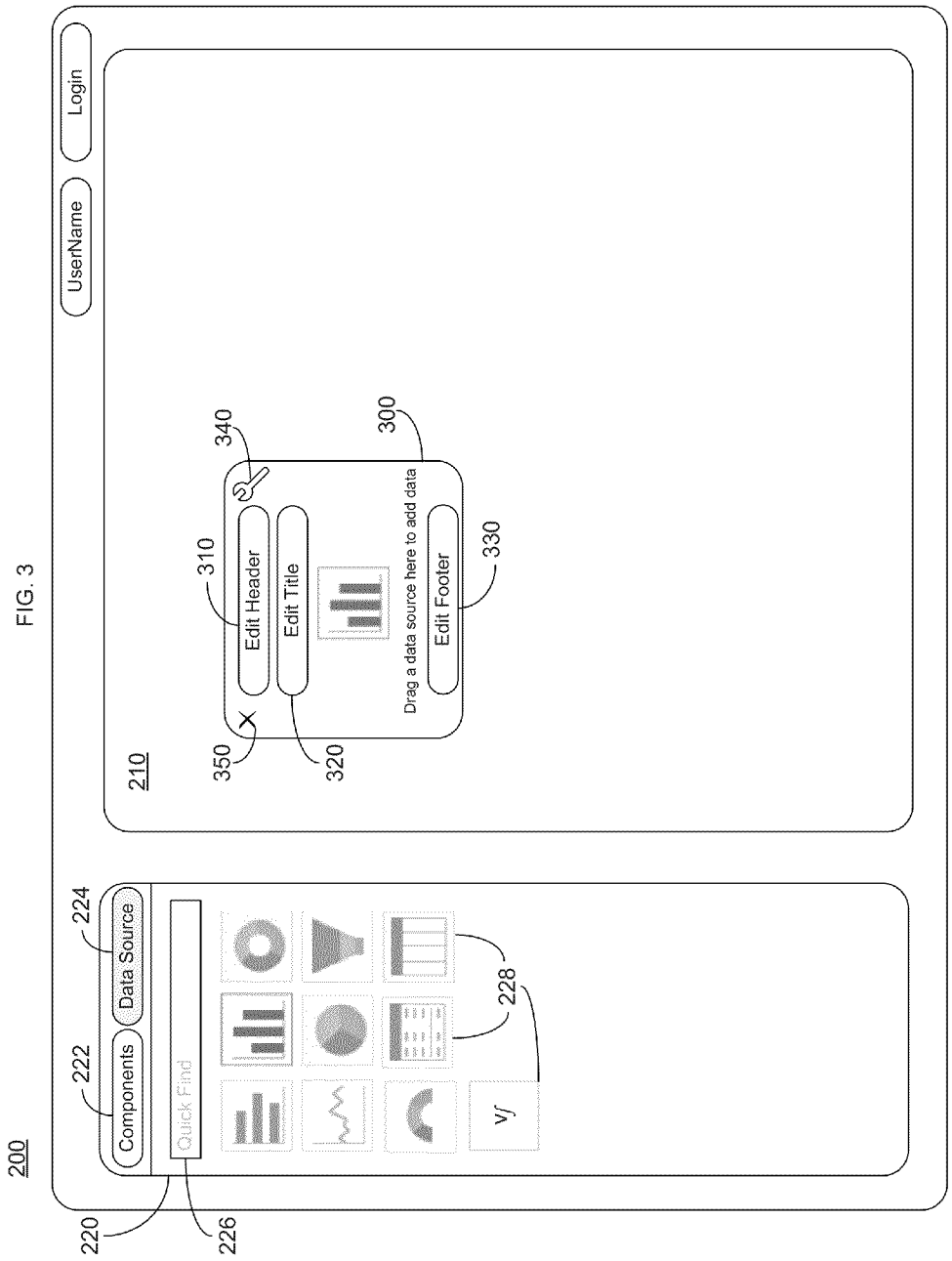
FIG. 3 illustrates another exemplary dashboard generation interface in accordance with an embodiment.

FIG. 3 illustrates another exemplary dashboard generation interface 200, in accordance with an embodiment. In the embodiment illustrated in FIG. 3 a user has selected a component type in the utility 200, in this example a column chart, by dragging the corresponding icon 228 for the component and dropping the icon 228 onto a position on the workspace 210. The drag and drop operation causes the processor 105 to create a dashboard object 300 in the workspace 210 if there was no existing dashboard object 300 at that location. If there already was an existing dashboard object 300, the dashboard object may be modified, as discussed in further detail below.

The dashboard object 300 illustrated in FIG. 3 includes an editable entry 310 to enter a header for the dashboard object 300, an editable entry 320 to enter a title for the dashboard object and an editable entry 330 to enter a footer for the dashboard object. The editable entries 310-330 optionally allow a user to add text for the respective entries. The dashboard object 300 may also include a component editing tool 340 which allows the user to configure options for the dashboard object, as discussed in further detail below. The dashboard object 300 may also include a selectable object 350 to delete the dashboard object.

Figure 4:
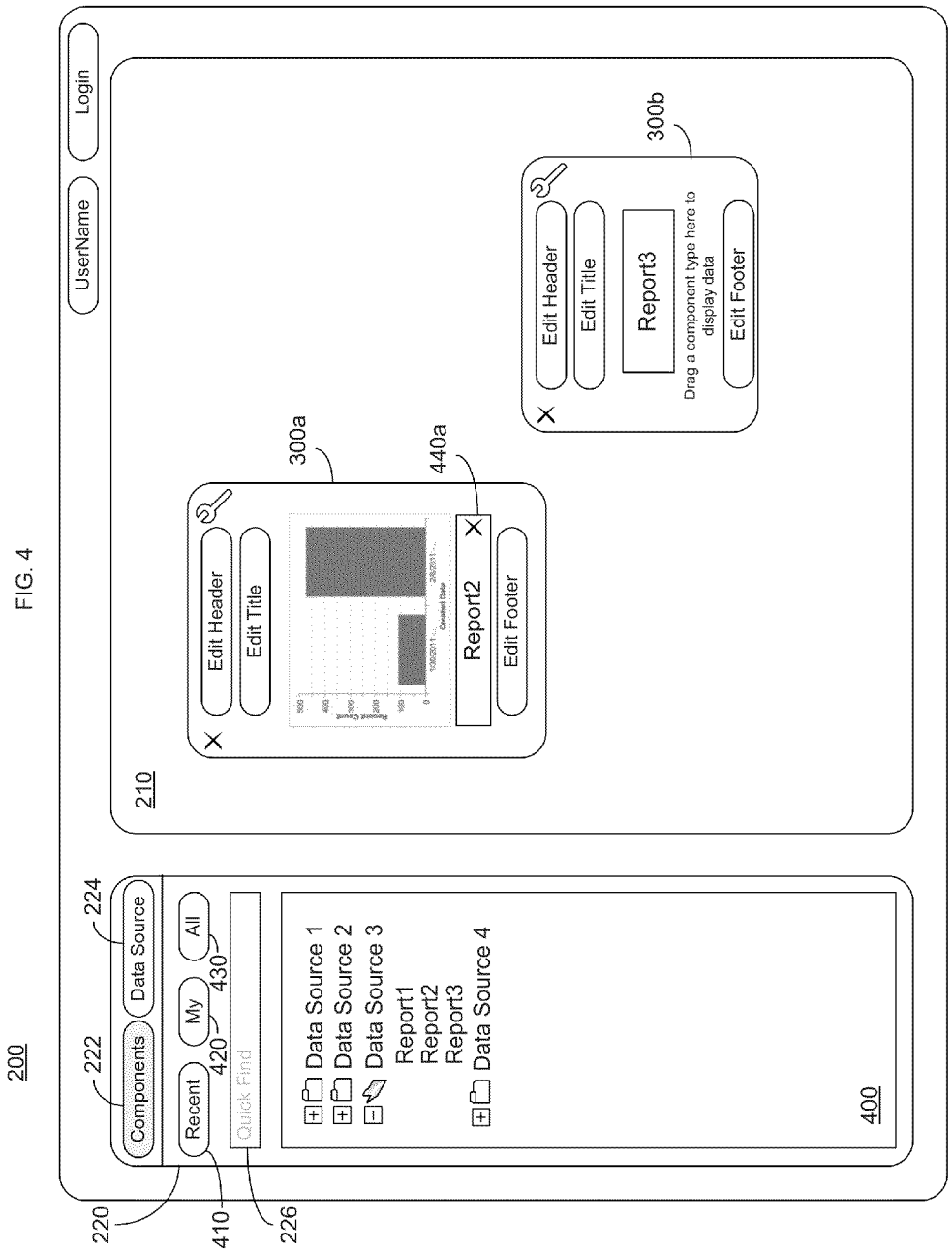
FIG. 4 illustrates yet another exemplary dashboard generation interface in accordance with an embodiment.

FIG. 4 illustrates another exemplary dashboard generation interface 200, in accordance with an embodiment. In the embodiment illustrated in FIG. 4, a user has selected the data source tab 224. After the data source tab is selected by a user, the dashboard creation utility 220 is configured to display a data source navigational interface 400. The data source navigational interface 400 illustrated in FIG. 4 includes a navigable file system which the user could explore to locate a desired data source. The data sources may be a report, a visual force page, or an s-control or the like. A visualforce page, for example, is a user created web page written in Salesforce.com's proprietary development language. S-controls are wrappers that allow standard web development code to be embedded into the Salesforce.com application. The data sources illustrated in FIG. 4 are illustrated in a list format, however, in other embodiments the data sources may be presented as icons.

The dashboard creation utility 220 may also include other navigational options. For example, the dashboard creation utility 220 may include a tab 410 to display recently accessed data sources, a tab 420 to display data sources created by the user and/or a tab 430 to display a list off all the data sources that the user has access to in the multitenant database system. As discussed above, the dashboard creation utility 220 may also include a search tool 226, which could allow a user to search for a data source.

After the user has located a desired data source, the users can use a drag and drop operation to add the data source to a dashboard object 300. In the exemplary embodiment illustrated in FIG. 4, a user has selected and added the selected data source to dashboard object 300a. After the user has added the data source to the dashboard object 300a, the dashboard object 300a is modified to display the data source according to the selected component type. In the exemplary embodiment illustrated in FIG. 4, a column type chart was selected by the user.

If a user desires to display a different data source in dashboard object 300a the user can select a data source removal interface 440a to remove the data source from the object 300a. Alternatively, the dashboard generation interface 200 can allow the user to replace the data source in dashboard object 300a by dragging and dropping another data source on to the dashboard object 300a. Similarly, the user can change the component type for dashboard object 300*a* by dragging and dropping a new component type onto the dashboard object 300*a*.

The user can also create a dashboard object by dragging and dropping a data source onto the workspace 210. In the exemplary embodiment illustrated in FIG. 4 a user has added dashboard object 300*b* to the workspace 210 by dragging and dropping Report3 thereon. The user may then add a component type to the dashboard object 300*b* by dragging and dropping a component type thereon, as discussed above.

Figure 5:
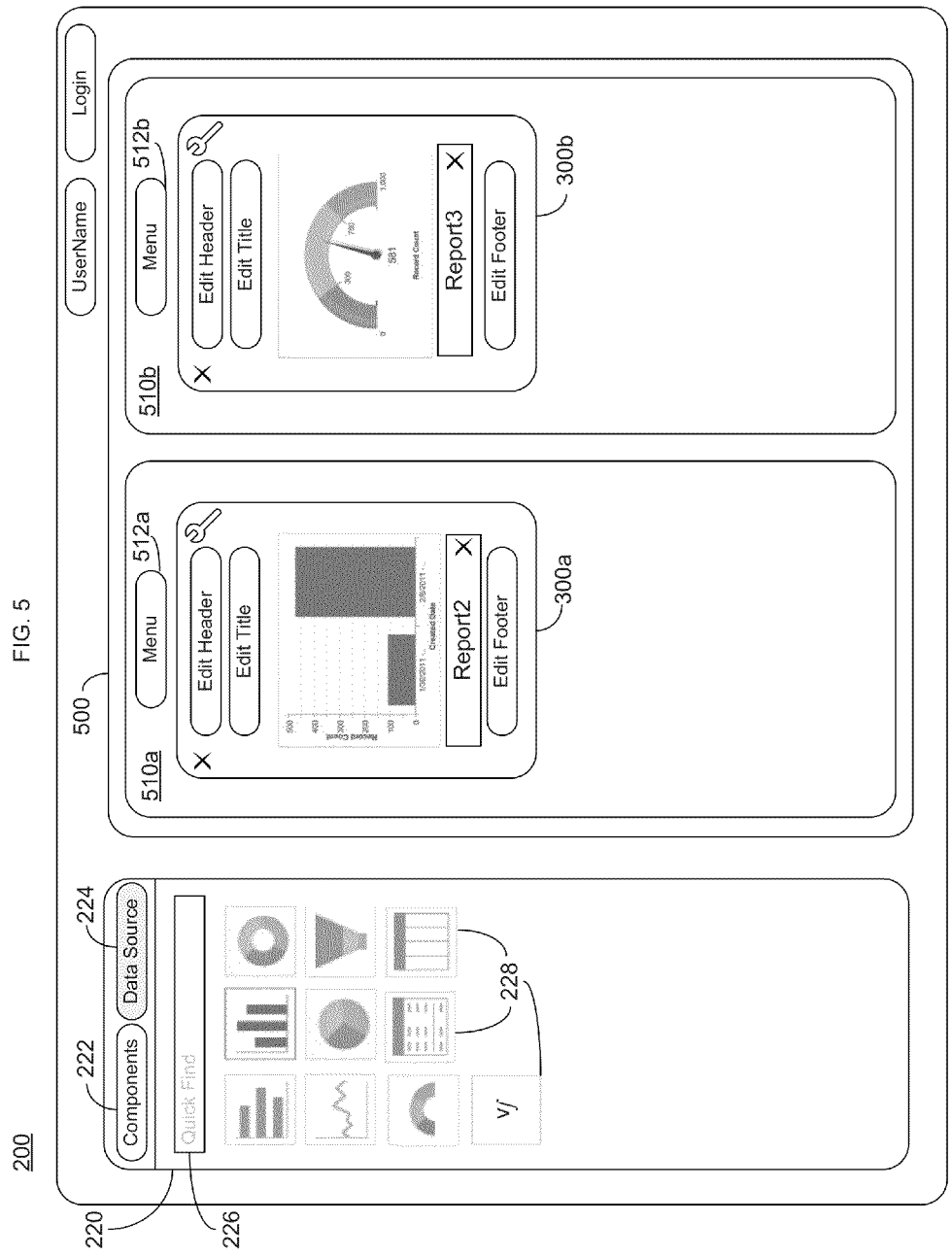
FIG. 5 illustrates yet another exemplary dashboard generation interface in accordance with an embodiment.

FIG. 5 illustrates yet another exemplary dashboard generation interface 200, in accordance with an embodiment. In the embodiment illustrated in FIG. 5 the dashboard generation interface 200 includes a delineated workspace 500. In the embodiment illustrated in FIG. 5, the workspace 500 includes two work areas 510*a* and 510*b*. However, the workspace 500 can be configured to include any number of work areas 510. The delineated workspace 500 can assist the user in organizing the dashboard by providing predefined work areas 510 where the dashboard objects 300 can be added.

In other embodiments, the workspace 500 may be configured to have work areas 510 arranged in rows rather than columns. In yet other embodiments the work areas 510 may be arranged as a series of squares. Any number of work areas 510 of any shape may be included in the workspace 500.

Each work area 510 may have a menu system 512*a-b*. The menu system 512*a-b* can be used to configure the corresponding work area. For example, the menu system may include options to adjust properties of the work area 510, such as the size of the work area 510. In other embodiments, the menu system 512*a-b* allows a user to adjust properties of any dashboard objects 300 within the respective work area 510.

As discussed above, each dashboard object includes a component editing tool 340. When a user selects a component editing too, the user is presented with a component editing interface.

Figure 6:
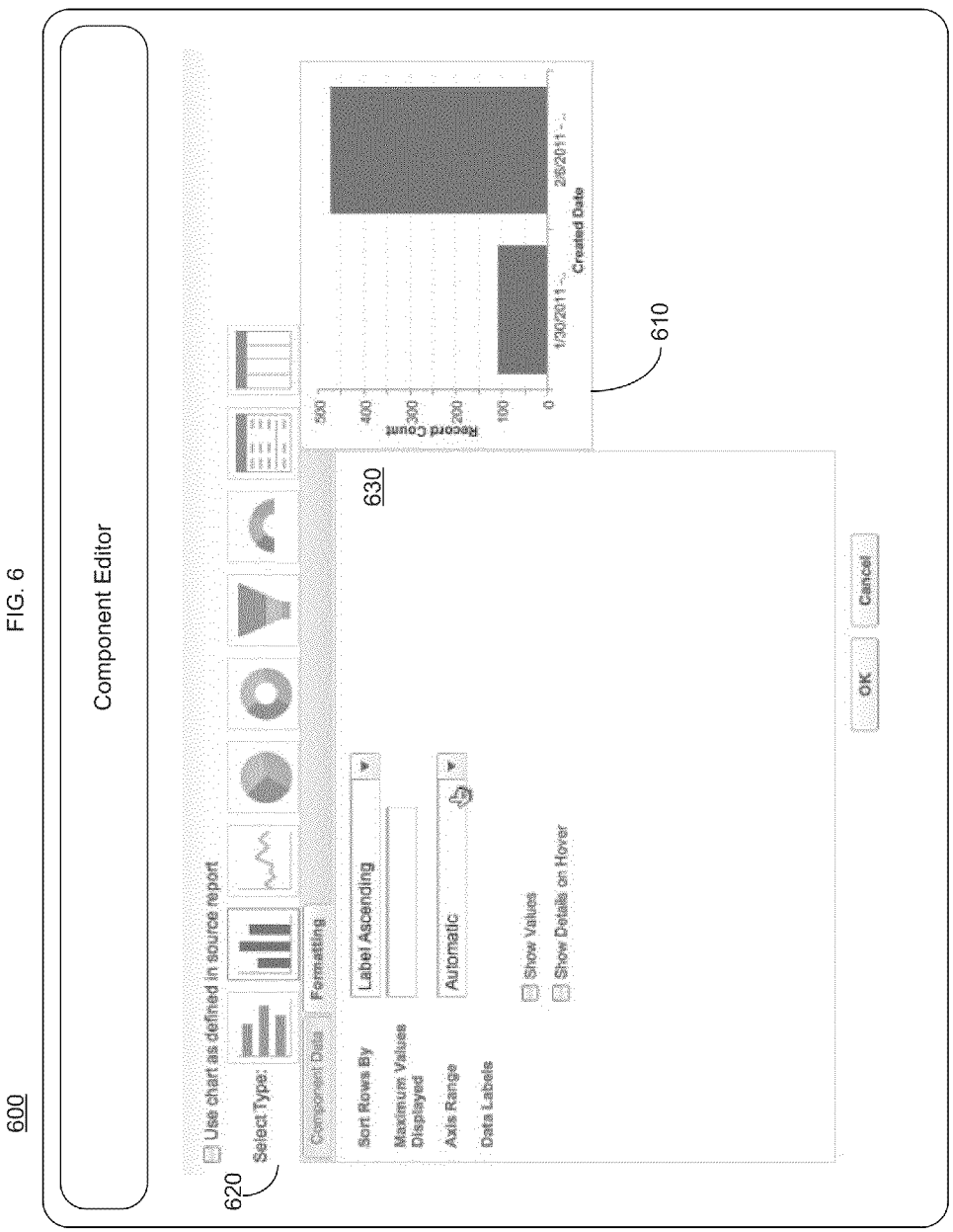
FIG. 6 illustrates an exemplary component editing interface in accordance with an embodiment.

FIG. 6 illustrates an exemplary component editing interface 600. The component editing interface 600 illustrated in FIG. 6 may be presented, for example, when the user selects the component editing tool 340*a* illustrated in FIG. 5. The component editing interface includes 600 a real-time display 610 of the dashboard object 300. If the user chooses to make any changes to the dashboard object 300, the real-time display 610 displays a preview the changes.

The component editing interface includes 600 includes a component selection tool 620. The component selection tool 620 allows the users to change the component type for the selected dashboard object 300. If a user elects to change the component type using the component selection tool, the real-time display 610 previews the change in real-time allowing the user to see what the selected report will look like as displayed in accordance with the newly selected component type. The component selection tool 620 illustrated in FIG. 6 utilizes a series of icons which display generic representations of the component type associated with the icons. In other embodiments, the component selection tool 620 may be a list or a searchable field, or any combination of the selection tools.

The component editing interface includes 600 also includes a formatting interface 630. The formatting interface 630 allows the user to configure the component. Each component type could have different formatting options. For example, in FIG. 6, the formatting options relate to a column chart.

Figure 7:
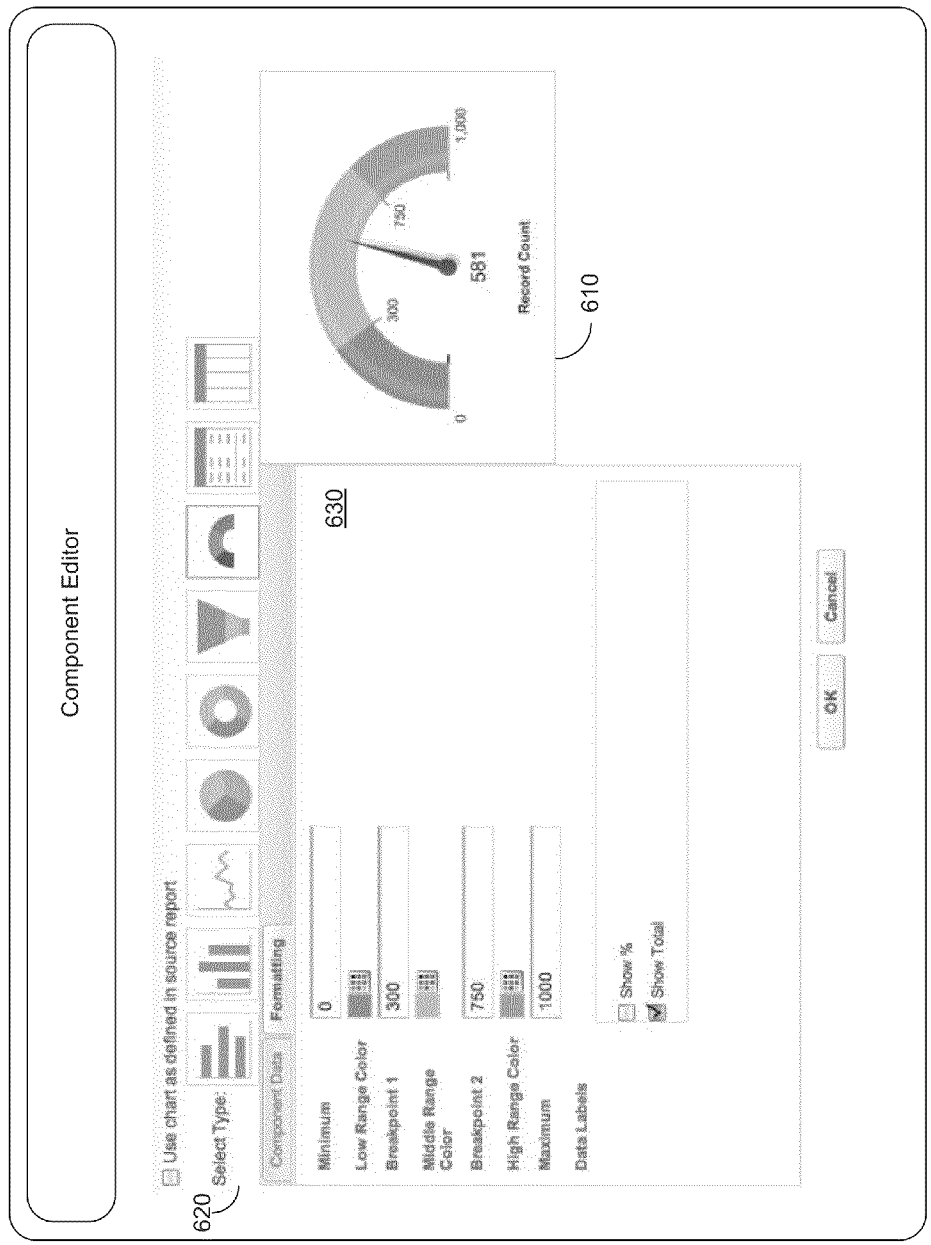
FIG. 7 illustrates an exemplary component editing interface in accordance with an embodiment.

FIG. 7 illustrates another exemplary component editing interface 700. The component editing interface 700 illustrated in FIG. 7 may be presented, for example, when the user selects the component editing tool 340*b* illustrated in FIG. 5. As seen in FIG. 7, the formatting interface 630 has different formatting options based upon the selected component type. In the exemplary embodiment illustrated in FIG. 7, the selected component type is a gauge chart. Accordingly, the options available in the formatting interface relate to gauge charts. For example, the user may alter the minimum and maximum range of the gauge.

The formatting interface 630 may also include generic options for all components. For example, a background color or pattern could be selected for one or all of the components.

Figure 8:
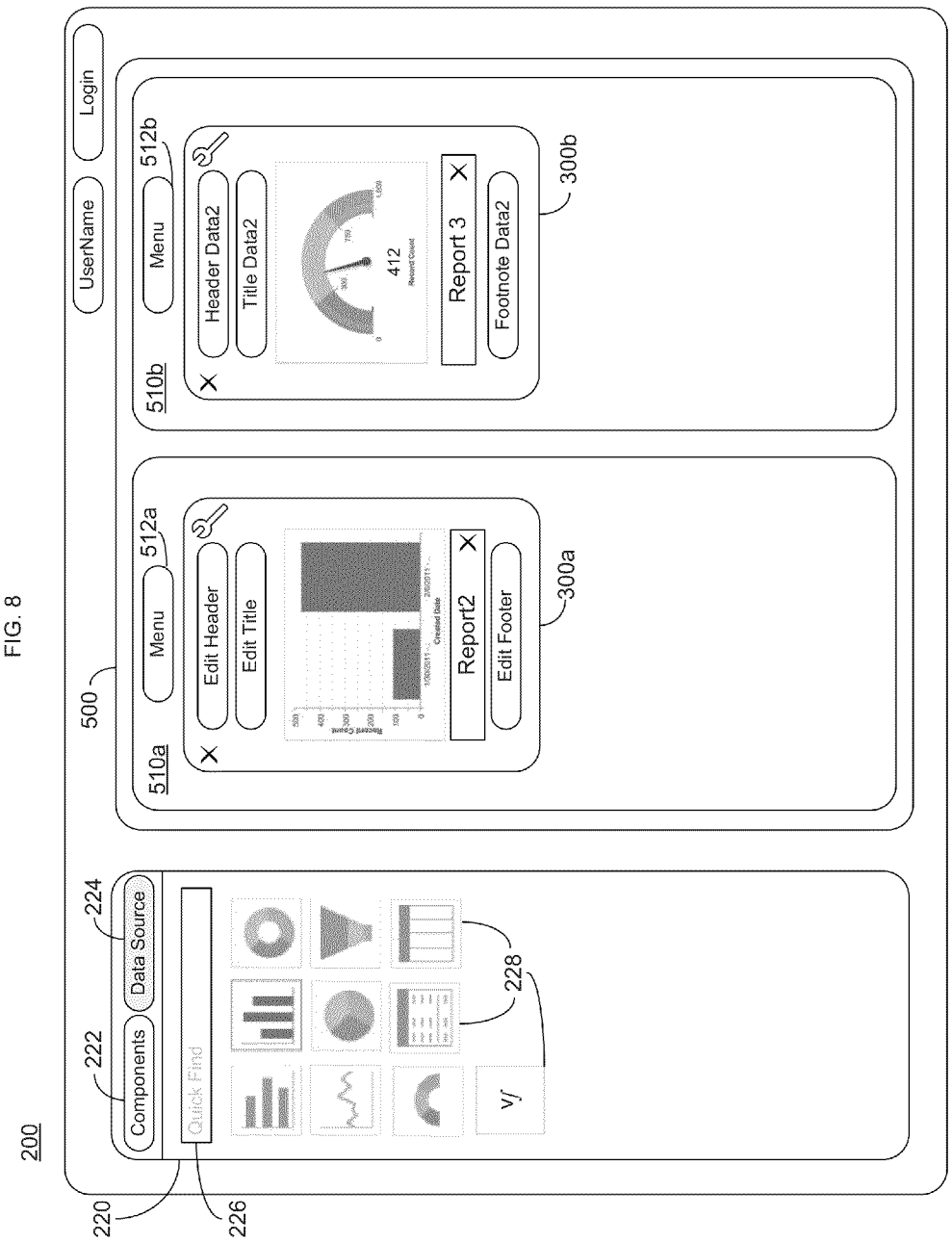
FIG. 8 illustrates yet another exemplary dashboard generation interface in accordance with an embodiment.

As discussed above, data sources in a multi-tenant database system can be both user and tenant dependent. Accordingly, in one embodiment if a second user were to edit a dashboard created by a first user, a data source specific to the first user may be blocked. In some instances the data source specific to the first user may have a corresponding data source for the second user in the database 130. FIG. 8 illustrates yet another exemplary dashboard generation interface 200, in accordance with an embodiment. In FIG. 8 a second user (username2) has opened the dashboard. In this exemplary embodiment, Report2 in dashboard object 300*a* is a user independent report while Report3 in dashboard object 300*b* is a user dependent report. As seen in FIG. 8, the data illustrated in dashboard object 300*b* has changed, when compared to the data illustrated in dashboard object 300*b* as illustrated in FIG. 5.

FIG. 9 illustrates an exemplary dashboard 900 generated based upon the dashboard illustrated in FIG. 8. The dashboard 900 includes dashboard objects 300*a* and 300*b* at their respective positions as determined by the user in the dashboard generation interface. As discussed above, the data in exemplary object 300*b* is user dependent. Accordingly, depending upon which user is viewing the dashboard 900, the data in dashboard object 300*b* will change.

FIG. 10 is a flow diagram illustrating an exemplary method for creating a dashboard using the dashboard generating application 150 and dashboard generation interface 200, in accordance with an embodiment. As discussed above, a user on a client device 140A-B can issue a request to open the dashboard generating application 150. (Step 1002). The dashboard generating application 150 may then make a request to the common database 130 to receive a list of data sources available to the user. (Step 1004). The data sources available to the user may depend upon which tenant the user belongs to and the permissions that the user has within the tenant's data. The database 130 then returns the available data sources to the dashboard generating application. (Step 1006). The dashboard generating application 150 may then generate display data for the dashboard generating interface, as seen in various stages for example, in FIGS. 2-8. (Step 1008).

The user, on client device 140A-B can then interact with the dashboard generation interface 200 to create a dashboard object. (Step 1010). As discussed above, a user may request the creation of a dashboard object by providing a position for the dashboard object and one of a component type and a data source within the database using a first drag and drop operation and the other of the component type and the data source within the database for the dashboard object using a second drag and drop operation. The dashboard generating application 150 then requests the data for the requested data source from the database 130 so that the dashboard generating application can create the dashboard object 300. (Step 1012). The database 130, after receiving the data request, returns the data to the dashboard generating application. (Step 1014). The dashboard generating application 150 then generates the display data to display the dashboard object 300 and transmits the display data to the client device 140A-B. (Step 1016). As discussed above, a user of the client device 140A-B can modify the generated dashboard object using the dashboard generating interface 200 or the component editing interfaces 600 or 700. (Step 1018). The dashboard generating application, based upon any modifications requested by the user, generates display data for the updated dashboard objects and returns the generated display data to the client device 140A-B. (Step 1020).

Generally speaking, the various functions and features of method 1000 may be carried out with any sort of hardware, software and/or firmware logic that is stored and/or executed on any platform. Some or all of method woo may be carried out, for example, by logic executing within system 100 in FIG. 1. For example, various functions shown in FIG. 10 may be implemented using software or firmware logic that is stored in memory 106 and executed by processor 105 as part of application platform 110. The particular hardware, software and/or firmware logic that implements any of the various functions shown in FIG. 10, however, may vary from context to context, implementation to implementation, and embodiment to embodiment in accordance with the various features, structures and environments set forth herein. The particular means used to implement each of the various functions shown in FIG. 10, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A system for creating a dashboard in a multi-tenant database environment, comprising:
    a database shared between multiple tenants and configured to securely store tenant based data that is commonly accessible to users represented by a first tenant of the multiple tenants and isolated from users of the other tenants; and
    a processor communicatively connected to the database, the processor configured to:
        generate display data for a component interface, wherein the component interface includes icons corresponding to a plurality of different component types;
        generate display data for a data source interface, wherein the data source interface includes a list of a plurality of different data sources within the database that are accessible by a user of the first tenant;
        receive positional data for one of a selected component type and a selected data source within the database for a dashboard object via data from a first drag and drop operation from the corresponding component interface or data source interface;
        generate display data for the dashboard based upon the received position of the one of the selected component type and the selected data source;
        receive the other of the selected component type and the selected data source within the database for the dashboard object via data from a second drag and drop operation when the second drag and drop operation drops the other of the selected component type and the selected data source onto the generated display of the first of the selected component type and selected data source from the corresponding component interface or data source interface;
        generate display data for the dashboard based upon the dashboard object in real time based upon the received selected component type, the received positional data and the received selected data source;
        receive login data associated with a user of a second tenant viewing the dashboard;
        determine if the selected data source is a variable user dependent data source;
        locate data for the variable user dependent data source corresponding to the login data, wherein the located data is from a different data source that corresponds to the selected data source; and
        create display data for the dashboard object based upon the selected component type and the located data.

2. The system of claim 1, wherein the processor is further configured to:
    receive data from a third drag and drop operation based upon a user's interaction with the component interface or data source interface;
    determine a position corresponding to the third drag and drop operation based upon the received data from the third drag and drop operation;
    determine if an existing dashboard object is associated with the determined position; and
    create a second dashboard object at the determined position if no existing dashboard object is associated with the determined position.

3. The system of claim 2, wherein the processor is further configured to:
    update the existing dashboard object based upon data associated with the third drag and drop operation when the existing dashboard object is associated with the determined position of the third drag and drop operation.

4. The system of claim 3, wherein the processor is further configured to:
    associate a component type with the created dashboard object when the received data from the third drag and drop operation is associated with a component type.

5. The system of claim 3, wherein the processor is further configured to:
    associate a data source with the created dashboard object when the received data from the third drag and drop operation is associated with a data source.

6. A method for creating a dashboard in a multi-tenant database environment, comprising:
    generating, by a processor, display data for a component interface, wherein the component interface includes icons corresponding to a plurality of different component types;
    generating, by the processor, display data for a data source interface, wherein the data source interface includes a list of a plurality of different data sources within a database that are accessible by a user of a first tenant, wherein the database is shared between multiple tenants and configured to securely store tenant based data that is commonly accessible to users represented by the first tenant of the multiple tenants and isolated from users of the other tenants;

receiving, by the processor, positional data for one of a selected component type and a selected data source within the database in the multi-tenant database environment for a dashboard object via a first drag and drop operation from the corresponding component interface or data source interface;

generating, by the processor, display data for the dashboard based upon the received position of the one of the selected component type and the selected data source;

receiving, by the processor, the other of the selected component type and the selected data source within the database in the multi-tenant database environment for the dashboard object via a second drag and drop operation from the corresponding component interface or data source interface when the second drag and drop operation drops the other of the selected component type and the selected data source onto the generated display of the one of the selected component type and selected data source; and generating, by the processor, display data for the dashboard based upon the dashboard object in real time based upon the received selected component type, the received positional data and the received selected data source;

receiving, by the processor, login data associated with a user of a second tenant viewing the dashboard;

determining, by the processor, if the selected data source is a variable user dependent data source;

locate, by the processor, data for the variable user dependent data source corresponding to the login data, wherein the located data is from a different data source that corresponds to the selected data source (par. 39); and creating, by the processor, display data for the dashboard object based upon the located data for the variable user dependent data source and the selected component type.

7. The method of claim 6, further comprising:
receiving, by the processor, data from a third drag and drop operation based upon a user's interaction with the component interface or data source interface;

determining, by the processor, a position corresponding to the third drag and drop operation based upon the received data from the third drag and drop operation;

determining, by the processor, if an existing dashboard object is associated with the determined position; and creating, by the processor, a second dashboard object at the determined position if no existing dashboard object is associated with the determined position.

8. The method of claim 7, further comprising:
updating, by the processor, the existing dashboard object based upon data associated with the third drag and drop operation when the existing dashboard object is associated with the determined position of the third drag and drop operation.

9. The method of claim 8, further comprising:
associating, by the processor, a component type with the created dashboard object when the received data from the third drag and drop operation is associated with a component type.

10. The method of claim 8, further comprising:
associating, by the processor, a data source with the created dashboard object when the received data from the third drag and drop operation is associated with a data source.

11. A computer implemented method, comprising:
generating display data for a workspace;

generating display data for a dashboard creation utility, the display data comprising a component interface and a data source interface, wherein the component interface includes icons corresponding to a plurality of different component types and the data source interface includes a list of a plurality of different data sources within a database that is part of a multi-tenant database system, the data sources being accessible by a user of a first tenant, wherein the database is shared between multiple tenants and configured to securely store tenant based data that is commonly accessible to users represented by the first tenant of the multiple tenants and isolated from users of the other tenants;

receiving data from a first drag and drop operation wherein the user has dragged and dropped a one of the plurality of icons corresponding to a selected component type from the component interface for a dashboard object from the dashboard creation utility onto a position on the workspace;

creating the dashboard object at the position on the workspace;

receiving data from a second drag and drop operation wherein the user has dragged and dropped a data source within the multi-tenant database system from the data source interface for the dashboard object from the dashboard creation utility onto the dashboard object on the workspace;

generating, in real time, a dashboard at the position in the workspace based upon the received component type and data source;

receiving login information for a user of a second tenant of the multi-tenant database system;

updating the dashboard based upon the login information, wherein the updating comprises:
  determining if the data source is a variable user dependent data source dependent upon the login information; and
  locating, when the data source is the variable user dependent data source, data for the dashboard based upon the login information, wherein the located data is from a different data source that corresponds to the data source;
  creating display data for the dashboard object based upon the located data and the selected component type.

12. The method of claim 11, further comprising:
creating, when a position associated with the second drag and drop operation is different than the position associated with the first drag and drop operation a second dashboard object at the position on the workspace associated with the second drag and drop operation.

13. The method of claim 11, further comprising:
generating display data for a component editing interface; and
updating the dashboard in real time based upon editing data received at the component editing interface.

14. The method of claim 13, wherein the generating display data for a component editing interface further comprises:
determining a component type associated with a selected dashboard object; and
generating display data for a component editing interface based upon the determined component type.

* * * * *